(12) United States Patent
Murschall et al.

(10) Patent No.: US 7,056,573 B2
(45) Date of Patent: Jun. 6, 2006

(54) MATT, UV-STABLE, CO-EXTRUDED POLYESTER FILM, A METHOD FOR THE PRODUCTION THEREOF AND THE USE OF THE SAME

(75) Inventors: Ursula Murschall, Nierstein (DE); Ulrich Kern, Ingelheim (DE); Guenther Crass, Taunusstein (DE); Gottfried Hilkert, Saulheim (DE)

(73) Assignee: Mitsubishi Polyester Film GmbH, Wiesbaden (DE)

( * ) Notice: Subject to any disclaimer, the term of this patent is extended or adjusted under 35 U.S.C. 154(b) by 269 days.

(21) Appl. No.: 10/181,762

(22) PCT Filed: Jan. 10, 2001

(86) PCT No.: PCT/EP01/00213

§ 371 (c)(1),
(2), (4) Date: Jul. 18, 2002

(87) PCT Pub. No.: WO01/53091

PCT Pub. Date: Jul. 26, 2001

(65) Prior Publication Data

US 2003/0157352 A1 Aug. 21, 2003

(30) Foreign Application Priority Data

Jan. 20, 2000 (DE) .............................. 100 02 178

(51) Int. Cl.
B32B 27/06 (2006.01)
B32B 27/08 (2006.01)
B32B 27/30 (2006.01)
B32B 27/36 (2006.01)
B32B 27/40 (2006.01)

(52) U.S. Cl. ...................... 428/212; 428/213; 428/216; 428/336; 428/423.7; 428/430; 428/446; 428/447; 428/458; 428/469; 428/480; 428/483; 428/910; 264/288.8; 264/290.2; 525/437; 525/444

(58) Field of Classification Search ................ 428/480, 428/483, 410; 264/288.4, 290.2; 525/437, 525/444; 528/293, 295, 302, 305, 308, 308.6, 528/308.7

See application file for complete search history.

(56) References Cited

U.S. PATENT DOCUMENTS

| | | | |
|---|---|---|---|
| 4,252,885 A | 2/1981 | McGrail et al. | |
| 4,399,179 A | 8/1983 | Minami et al. | |
| 5,073,435 A | 12/1991 | Eyraud et al. | |
| 5,955,181 A * | 9/1999 | Peiffer et al. | 428/212 |
| 6,358,604 B1 * | 3/2002 | Peiffer et al. | 428/336 |
| 6,607,808 B1 * | 8/2003 | Peiffer et al. | 428/141 |
| 6,630,224 B1 * | 10/2003 | Peiffer et al. | 428/141 |
| 2002/0068158 A1 * | 6/2002 | Peiffer et al. | 428/220 |
| 2002/0068159 A1 * | 6/2002 | Peiffer et al. | 428/220 |
| 2002/0071945 A1 * | 6/2002 | Peiffer et al. | 428/220 |
| 2002/0114944 A1 * | 8/2002 | Peiffer et al. | 428/336 |
| 2003/0087105 A1 * | 5/2003 | Murschall et al. | 428/423.7 |
| 2003/0108754 A1 * | 6/2003 | Murschall et al. | 428/480 |
| 2003/0108755 A1 * | 6/2003 | Murschall et al. | 428/480 |
| 2003/0180560 A1 * | 9/2003 | Peiffer et al. | 428/480 |

FOREIGN PATENT DOCUMENTS

| | | |
|---|---|---|
| EP | 0 144 878 A2 | 6/1985 |
| EP | 0 144 978 A2 | 6/1985 |
| EP | 0 296 620 A2 | 12/1988 |
| EP | 0 584 044 A1 | 2/1994 |
| EP | 0 587 148 A2 | 3/1994 |
| EP | 0 602 964 A1 | 6/1994 |
| EP | 0 620 245 A1 | 10/1994 |
| EP | 0 826 478 A2 | 3/1998 |
| EP | 0 976 548 * | 2/2000 |
| EP | 0 976 548 A2 | 2/2000 |
| GB | 2 344 596 * | 6/2000 |
| JP | 2000-052523 * | 2/2000 |
| WO | WO 94/13476 A1 | 6/1994 |
| WO | WO 94/13481 A1 | 6/1994 |
| WO | WO 98/06575 * | 2/1998 |

OTHER PUBLICATIONS

Schimtz, Peter et al., "Films." Ullmann's Encyclopedia of Industrial Chemistry, 5th Ed., vol. A11 (1988), pp. 85-95, 108-110.*

Werner, Eberhard et al., "Polyester, Films." Encyclopedia of Polymer Science and Engineering, vol. 12 (1988), pp. 193-216.*

Whelan, Tony, Polymer Technology Dictionary (1994), p. 464.*

H. Day, D. M. Wiles Journal Applied Polymer Science vol. 16, p. 203, 1972.

* cited by examiner

Primary Examiner—Vivian Chen
(74) Attorney, Agent, or Firm—ProPat, L.L.C.

(57) ABSTRACT

The invention relates to a co-extruded, biaxially oriented polyester film consisting of a base layer and at least one outer layer. The film contains a UV-stabilizer and has a matt outer layer which contains a mixture and/or a blend of two components (I) and (II), whereby component (I) is substantially a polyethylene terephthalate homopolymer or a polyethylene terephthalate copolymer, or a mixture of polyethylene terephthalate homopolymers or polyethyleneterephthalate copolymers, and component (II) is a polymer which contains at least one sulphonate group.

14 Claims, No Drawings

MATT, UV-STABLE, CO-EXTRUDED POLYESTER FILM, A METHOD FOR THE PRODUCTION THEREOF AND THE USE OF THE SAME

The invention relates to a biaxially oriented polyester film with a base layer which is composed of at least 70% by weight of a thermoplastic polyester, comprises a UV stabilizer, and has at least one matt outer layer which comprises a mixture or, respectively, a blend made from two components I and II. The invention further relates to the use of the film and to a process for its production.

Component I of the mixture or blend is a polyethylene terephthalate homopolymer or polyethylene terephthalate copolymer, or a mixture of polyethylene terephthalate homo- or copolymers.

Component II of the mixture or blend is a polyethylene terephthalate copolymer which is composed of the condensation product of the following monomers or, respectively, of their derivatives capable of forming polyesters: isophthalic acid, aliphatic dicarboxylic acid, sulfomonomer which contains a metal sulfonate group on the aromatic moiety of an aromatic dicarboxylic acid, and aliphatic or cycloaliphatic glycol.

The outer layer of the invention has a characteristic matt surface or appearance and is very suitable for use as packaging film or for industrial applications, in particular where a requirement is UV resistance or impermeability to UV light.

BACKGROUND OF THE INVENTION

There is high industrial demand for transparent, highgloss plastic films, e.g. biaxially oriented propylene films or biaxially oriented polyester films. There is also an increasing demand for films of this type which give protection from ultraviolet radiation and which have at least one surface layer which is not high-gloss but has a characteristic matt appearance and therefore, for example, provides the packaging with an appearance which is particularly attractive and therefore effective for promotional purposes, and provides protection from UV radiation.

U.S. Pat. No. 4,399,179 describes a coextruded biaxially oriented polyester film which is composed of a transparent base layer and of at least one matt layer which essentially consists of a certain polyethylene terephthalate copolymer and also comprises inert particles with a diameter of from 0.3 to 20 μm at a concentration of from 3 to 40%. The specific copolymer is a processing aid which reduces the viscosity of the melt comprising the inert particles, thus permitting satisfactory extrusion of that layer. The mattness of the film is achieved by adding the inert particles to the appropriate layer.

EP 0 144 978 describes a self-supporting oriented film made from thermoplastic and, on at least one of its two surfaces, bearing a continuous polyester coating which is applied as aqueous dispersion to the film prior to the final stretching step. The polyester coating is composed of a condensation product of various monomers which are capable of forming polyesters, such as isophthalic acid, aliphatic dicarboxylic acids, sulfomonomers, and aliphatic or cycloaliphatic glycols.

EP-A-0 620 245 describes films with improved heat resistance. These films comprise antioxidants which are suitable for scavenging free radicals formed in the film and degrading any peroxide formed. However, that specification gives no proposal as to how the UV resistance of films of that type might be improved.

The instances described give no indication as to how at least one surface of the film can be provided with low gloss while retaining high film transparency, or how the film is to absorb UV light, or how the film is to be provided with high UV resistance.

It was therefore an object of the present invention to provide a coextruded biaxially oriented and transparent polyester film which has at least one matt outer layer and whose production is simple and cost-effective, and which has the good physical properties of known films, causes no disposal problems, and in particular absorbs UV light and has high UV resistance.

BRIEF DESCRIPTION OF THE INVENTION

This object is achieved by means of a coextruded and biaxially oriented polyester film of the generic type mentioned at the outset, the characterizing features of which are that the film comprises at least one UV stabilizer, the UV stabilizer being fed by way of masterbatch technology, and has a matt outer layer which comprises a mixture or, respectively, a blend made from two components I and II.

DETAILED DESCRIPTION OF THE INVENTION

Component I of the mixture or blend is a polyethylene terephthalate homopolymer or polyethylene terephthalate copolymer, or a mixture made from polyethylene terephthalate homo- or copolymers.

Component II of the copolymer or of the mixture or blend is a polymer containing at least one sulfonate group, in particular a condensation product of the following monomers or of their derivatives capable of forming polyesters:

A) from 65 to 95 mol % of isophthalic acid;
B) from 0 to 30 mol % of at least one aliphatic dicarboxylic acid with the formula

where
n is from 1 to 11;
C) from 5 to 15 mol % of at least one sulfomonomer containing an alkali metal sulfonate group on the aromatic moiety of a dicarboxylic acid;
D) a copolymerizable aliphatic or cycloaliphatic glycol having from 2 to 11 carbon atoms, in the stoichiometric amount necessary to form 100 mol % of condensate;
where each of the percentages given is based on the total amount of the monomers forming component II.

High UV resistance means that sunlight or other UV radiation causes no, or only extremely little, damage to the films, and that the films are therefore suitable for outdoor applications and/or critical indoor applications. In particular, the films should not yellow after a number of years of outdoor use, nor display any embrittlement or cracking of the surface, nor should their mechanical properties deteriorate. High UV resistance therefore means that the film absorbs UV light and does not transmit light until the visible region has been reached.

The good mechanical properties include high modulus of elasticity ($E_{MD}$>3200 N/mm$^2$; $E_{TD}$>3500 N/mm$^2$) and also good values for tensile strength at break (in MD>100 N/mm$^2$; in TD>130 N/mm$^2$).

Good orientability includes the capability of the film to give excellent orientation both longitudinally and transversely during its production, without break-offs.

For the purposes of the present invention, mixtures are mechanical mixtures prepared from the individual components. For this, the individual constituents are generally combined in the form of small-dimensioned compressed moldings, e.g. lenticular or bead-shaped pellets, and mixed with one another mechanically, using a suitable agitator. Another way of producing the mixture is to feed components I and II in pellet form separately to the extruder for the outer layer of the invention, and to carry out the mixing in the extruder and/or in the downstream systems for transporting the melt.

For the purposes of the present invention, a blend is an alloy-like composite of the individual components I and II which can no longer be separated into the initial constituents. A blend has properties like those of a homogeneous material and can therefore be characterized by appropriate parameters.

According to the invention, the film has at least two layers. The layers which it then encompasses are a layer B (=base layer) and the outer layer A of the invention. In one preferred embodiment of the invention, the film has a three-layer structure, and has the outer layer A on one side of the layer B and has another layer C on the other side of the layer B. In this case, the two layers A and C form the outer layers A and C. According to the invention, the UV stabilizer may be present in the outer layer(s) and/or in the base layer.

The base layer B of the film is preferably composed of at least 70% by weight of a thermoplastic polyester. Polyesters suitable for this purpose are those made from ethylene glycol and terephthalic acid (=polyethylene terephthalate, PET), from ethylene glycol and naphthalene-2,6-dicarboxylic acid (=polyethylene 2,6-naphthalate, PEN), from 1,4-bishydroxymethylcyclohexane and terephthalic acid (=poly-1,4-cyclohexanedimethylene terephthalate, PCDT), or else made from ethylene glycol, naphthalene-2,6-dicarboxylic acid and biphenyl-4,4'-dicarboxylic acid (=polyethylene 2,6-naphthalate dibenzoate, PENBB). Particular preference is given to polyesters, at least 90 mol %, preferably at least 95 mol %, of which is composed of ethylene glycol units and terephthalic acid units, or of ethylene glycol units and naphthalene-2,6-dicarboxylic acid units. The remaining monomer units derive from those other aliphatic, cycloaliphatic or aromatic diols and dicarboxylic acids. Other examples of suitable aliphatic diols are diethylene glycol, triethylene glycol, aliphatic glycols of the formula HO—(CH$_2$)$_n$—OH, where n is an integer from 3 to 6 (in particular 1,3-propanediol, 1,4-butanediol, 1,5-pentanediol and 1,6-hexanediol) and branched aliphatic glycols having up to 6 carbon atoms. Among the cycloaliphatic diols, mention should be made of cyclohexanediols (in particular 1,4-cyclohexanediol). Examples of other suitable aromatic diols have the formula HO—C$_6$H$_4$—X—C$_6$H$_4$—OH, where X is —CH$_2$—, —C(CH$_3$)$_2$—, —C(CF$_3$)$_2$—, —O—, —S— or —SO$_2$—. Bisphenols of the formula HO—C$_6$H$_4$—C$_6$H$_4$—OH are also very suitable.

Other aromatic dicarboxylic acids are preferably benzenedicarboxylic acids, naphthalene dicarboxylic acids (such as naphthalene-1,4- or -1,6-dicarboxylic acid), biphenyl-x,x'-dicarboxylic acids (in particular biphenyl-4,4'-dicarboxylic acid), diphenylacetylene-x,x'-dicarboxylic acids (in particular diphenylacetylene-4,4'-dicarboxylic acid) or stilbene-x,x'-dicarboxylic acids. Among the cycloaliphatic dicarboxylic acids mention should be made of cyclohexanedicarboxylic acids (in particular cyclohexane-1,4-dicarboxylic acid). Among the aliphatic dicarboxylic acids, C$_3$–C$_{19}$ alkanediacids are particularly suitable, and the alkane moiety here may be straight-chain or branched.

One way of preparing the polyesters is the transesterification process. Here, the starting materials are dicarboxylic esters and diols, which are reacted using the customary transesterification catalysts, such as the salts of zinc, of calcium, of lithium, of magnesium or of manganese. The intermediates are then polycondensed in the presence of well-known polycondensation catalysts, such as antimony trioxide or titanium salts. Another equally good preparation method is the direct esterification process in the presence of polycondensation catalysts. This starts directly from the dicarboxylic acids and the diols.

At least one outer layer of the multilayer film of the invention comprises a mixture or, respectively, a blend made from two components I and II and described in more detail below, and, where appropriate, comprises additives.

Component I of the outer layer mixture or of the blend essentially consists of a thermoplastic polyester, in particular the polyester described in more detail for the base layer. A method which has proven successful here for achieving a high degree of mattness is to use a polyester of comparatively low viscosity for component I of the outer layer of the invention. To describe the viscosities of the melts use is made of a modified solvent viscosity (SV or "standard viscosity"). The SVs of commercially available polyethylene terephthalates suitable for producing biaxially oriented films are in the range from 500 to 1 200. A method which has proven successful for obtaining a high degree of film mattness for the purposes of the present invention is to use polymers whose SV is in the range from 500 to 800, preferably in the range from 500 to 750, particularly preferably in the range from 500 to 700, for component I of the outer layer of the invention.

As stated above, component II of the outer layer mixture is obtained by condensation of the following monomers or of their derivatives capable of forming polymers:

A) isophthalic acid,
B) if appropriate, an aliphatic dicarboxylic acid of the formula

where
n is in the range from 1 to 11,
C) a sulfomonomer containing an alkali metal sulfonate group on the aromatic moiety of an aromatic dicarboxylic acid, and D) an aliphatic or cycloaliphatic glycol having from 2 to 11 carbon atoms, in the amount needed to form 100 mol % of condensate.

The total molar equivalents of acid present should be substantially the same as the total equivalents of glycol present.

Examples of dicarboxylic acids suitable as component B) of the copolyesters are malonic, adipic, azelaic, glutaric, sebacic, suberic, succinic and brassylic acid, and also mixtures of these acids or their derivatives capable of forming polyesters. Of the abovementioned acids, sebacic acid is preferred.

Examples of sulfomonomers which contain a metal sulfonate group on the aromatic moiety of an aromatic dicarboxylic acid (component C) are monomers of the following formula:

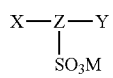

where
- M is a monovalent cation of an alkali metal,
- Z is a trivalent aromatic radical, and
- X and Y are carboxy groups or polyester-forming equivalents.

Monomers of this type are described in U.S. Pat. Nos. 3,563,942 and 3,779,993. Examples of monomers of this type are the sodium salts of sulfoterephthalic acid, of 5-sulfoisophthalic acid, of sulfophthalic acid, of 5-(p-sulfophenoxy)isophthalic acid, or of 5-sulfopropoxyisophthalic acid, and similar monomers, and also derivatives of these, such as the dimethyl esters, capable of forming polyesters. M is preferably $Na^+$, $Li^+$, or $K^+$.

The term "derivatives capable of forming polyesters" here means reaction participants with groups capable of condensation reactions, in particular transesterification reactions, to form polyester bonds. Groups of this type include carboxy groups. They also include the lower alkyl esters of these, e.g. dimethyl terephthalate, diethyl terephthalate, and numerous other esters, halides, and salts. The acid monomers are preferably used in the form of dimethyl esters, since this permits better control of the condensation reaction.

Examples of glycols suitable as component D) are ethylene glycol, 1,5-pentanediol, 1,6-hexanediol, neopentyl glycol, 1,10-decanediol, cyclohexanedimethanol, and similar substances. It is preferable to use ethylene glycol.

The copolyesters may be prepared by known polymerization techniques. The procedure is generally to combine the acid components with glycol and to heat these in the presence of an esterification catalyst, with subsequent addition of a polycondensation catalyst.

The quantitative ratios of components A, B, C, and D used to prepare the mixtures of the invention have been found to be decisive for obtaining the matt outer layer. For example, at least about 65 mol % of isophthalic acid (component A) has to be present as acid component. Component A is preferably from about 70 to 95 mol % of pure isophthalic acid.

As far as component B is concerned, any acid with the formula mentioned gives satisfactory results, and preference is given to adipic acid, azelaic acid, sebacic acid, malonic acid, succinic acid, glutaric acid, and mixtures of these acids. The desired amount within the range given is preferably from 1 to 20 mol %, based on the acid components of the mixture II, if component B is present in the composition.

The amount of the glycol component present is stoichiometric.

The copolyesters suitable for the purposes of the invention also have an acid value below 10, preferably from 0 to 3, an average molecular weight below about 50 000, and an SV in the range from about 30 to 700, preferably from about 350 to 650.

The ratio (ratio by weight) of the two components I and II of the outer layer mixture or blend may vary within wide limits and depends on the intended use of the multilayer film. The ratio of components I and II is preferably in the range from I:II=10:90 to I:II=95:5, preferably from I:II=20:80 to I:II=95:5, and in particular from I:II=30:70 to I:II=95:5.

Light, in particular the ultraviolet content of solar radiation, i.e. the wavelength region from 280 to 400 nm, causes degradation in thermoplastics, the results of which are not only a change in appearance due to color change or yellowing but also an adverse effect on mechanical and physical properties.

The suppression of this photooxidative degradation is of considerable industrial and economic importance, since without it many thermoplastics have drastically reduced scope of application.

The absorption of UV light by polyethylene terephthalates, for example, starts below 360 nm, increasing markedly below 320 nm, and is very pronounced below 300 nm. Maximum absorption occurs at between 280 and 300 nm.

In the presence of oxygen it is mainly chain cleavage which is observed, but without any crosslinking. The predominant photooxidation products in quantity terms are carbon monoxide, carbon dioxide and carboxylic acids. Besides direct photolysis of the ester groups, attention has to be paid to oxidation reactions which proceed via peroxide radicals, again to form carbon dioxide.

In photooxidation of polyethylene terephthalates there can also be cleavage of hydrogen at the position α to the ester groups, giving hydroperoxides and decomposition products of these, and this may be accompanied by chain cleavage (H. Day, D. M. Wiles, *J. Appl. Polym. Sci.* 16 [1972] p. 203).

UV stabilizers, or light stabilizers which are UV absorbers, are chemical compounds which can intervene in the physical and chemical processes of light-induced degradation. Carbon black and other pigments can give some protection from light, but these substances are unsuitable for transparent films, since they cause discoloration or color change. For transparent, matt films the only suitable compounds are organic or organometallic compounds which give rise to no, or only extremely slight, color or color change in the thermoplastic to be stabilized, i.e. are soluble in the thermoplastic.

UV stabilizers which are suitable light stabilizers for the purposes of the present invention are those which absorb at least 70%, preferably 80%, particularly preferably 90%, of the UV light in the wavelength region from 180 to 380 nm, preferably from 280 to 350 nm. These are particularly suitable if they are thermally stable, i.e. do not decompose, nor cause any evolution of gas, in the temperature range from 260 to 300° C. Examples of UV stabilizers which are suitable light stabilizers are 2-hydroxybenzophenones, 2-hydroxybenzotriazoles, organonickel compounds, salicylic esters, cinnamic ester derivatives, resorcinol monobenzoates, oxanilides, hydroxybenzoic esters, sterically hindered amines and triazines, preference being given to the 2-hydroxybenzotriazoles and the triazines.

In one particularly preferred embodiment, the film of the invention comprises from 0.01 to 5.0% by weight of 2-(4, 6-diphenyl-1,3,5-triazin-2-yl)-5-hexyloxyphenol of the formula

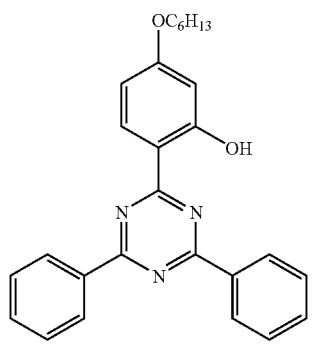

or from 0.01 to 5.0% by weight of 2,2-methylenebis(6-(2H-benzotriazol-2-yl)-4-(1,1,2,2-tetramethylpropyl)phenol) of the formula

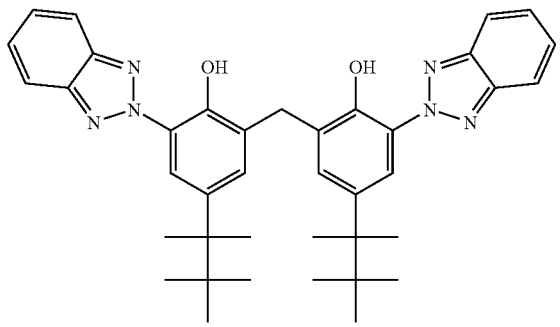

In one preferred embodiment, use may also be made of a mixture of these two UV stabilizers, or of a mixture of at least one of these two UV stabilizers with other UV stabilizers, the total concentration of light stabilizer preferably being from 0.01 to 5.0% by weight, based on the weight of crystallizable polyethylene terephthalate.

The UV stabilizer(s) are preferably present in the outer layer(s). If required, UV stabilizer may also have been provided in the core layer.

It was entirely surprising that the use of the abovementioned UV stabilizers in films gave the desired result. The skilled worker would probably have initially attempted to achieve some degree of UV resistance by using an antioxidant but would have found that the film rapidly yellows on weathering.

In the light of the fact that UV stabilizers absorb UV light and therefore provide protection, the skilled worker would probably have used commercially available stabilizers, and would then have found that the UV stabilizer has inadequate thermal stability and at temperatures of from 200 to 240° C. decomposes and evolves gases large amounts of UV stabilizer would have had to have been incorporated (from about 10 to 15% by weight) to absorb the UV light and prevent damage to the film.

At these high concentrations, the skilled worker would have found that the film becomes yellow just after it has been produced, with Yellowness Index deviations (YI) around 25. The mechanical properties of the film would also have been found to be adversely affected. Orientation would have produced exceptional problems, such as break-offs due to unsatisfactory strength, i.e. modulus of elasticity too low;

die deposits, causing profile variations;

roller deposits from the UV stabilizer, causing immpairment of optical properties (defective adhesion, non-uniform surface);

deposits in stretching frames or heat-setting frames, dropping onto the film.

It was therefore more than surprising that even low concentrations of the UV stabilizer of the invention achieve excellent UV protection. It was very surprising that, together with this excellent UV protection within the accuracy of measurement, the Yellowness Index of the film is unchanged from that of an unstabilized film;

there was no evolution of gases, nor any die deposits, nor any frame condensation, and the film therefore has excellent optical properties and excellent profile and layflat;

the UV-resistant film has excellent stretchability, and can therefore be produced in a reliable and stable manner on high-speed film lines at speeds of up to 420 m/min.

The base layer and/or the outer layer(s) may also comprise conventional additives, such as stabilizers and antiblocking agents. They are advantageously added to the polymer or polymer mixture before melting begins. Examples of stabilizers used are phosphorus compounds, such as phosphoric acid or phosphoric esters. Typical antiblocking agents (also termed pigments in this context) are inorganic and/or organic particles, such as calcium carbonate, amorphous silica, talc, magnesium carbonate, barium carbonate, calcium sulfate, barium sulfate, lithium phosphate, calcium phosphate, magnesium phosphate, aluminum oxide, lithium fluoride, the calcium, barium, zinc, or manganese salts of the dicarboxylic acids used, carbon black, titanium dioxide, kaolin, or crosslinked polystyrene particles or crosslinked acrylate particles.

Additives selected may also be mixtures of two or more different antiblocking agents, or mixtures of antiblocking agents of the same composition, but with different particle sizes. The usual concentrations of the particles may be added to each of the layers, e.g. in the form of a glycolic dispersion during polycondensation or by way of masterbatches during extrusion. Pigment concentrations which have proven particularly suitable are from 0.0001 to 10% by weight. Addition of these particles to the outer layer A of the invention gives another advantageous opportunity of varying the degree of mattness of the film. Increase in pigment concentration is generally associated with an increase in the degree of mattness of the film. An example of a detailed description of antiblocking agents is found in EP-A 0 602 964.

The present invention also provides a process for producing this film. It encompasses a) producing a film from base and outer layer(s) by coextrusion, b) biaxial orientation of the film, and c) heat-setting of the oriented film.

To produce the outer layer of the invention, it is advantageous to feed pellets of mixture component I and pellets of mixture component II in the desired mixing ratio directly to the extruder. It has proven advantageous for extrusion of the matt outer layer of the invention to use a twin-screw extruder, e.g. as described in EP-A 0 826 478. The materials can be melted and extruded at about 300° C. with a residence time of about 5 min. Under these conditions, transesterification reactions can proceed in the extruder, and these can form other copolymers from the homopolymers and the copolymers.

The UV stabilizer may be incorporated into the polymers of the outer layers and/or of the base layer before these leave the polymer producer.

It is particularly preferable for the UV stabilizer to be added by way of masterbatch technology directly during film production. The UV stabilizer is completely dispersed in a solid carrier material. Carrier materials which may be used are the actual outer layer polymer and/or base layer polymer, e.g. the polyethylene terephthalate, or else other polymers sufficiently compatible with the thermoplastic.

In masterbatch technology it is important that the grain size and the bulk density of the masterbatch are similar to the grain size and the bulk density of the base layer polymers and/or outer layer polymers, so that homogeneous distribution of the UV stabilizer can result, and therefore homogeneous UV resistance.

The polymers for the base layer are advantageously fed by way of another extruder. Any foreign bodies or contamination present may be filtered out from the polymer melt prior to extrusion. The melts are then extruded through a coextrusion die to give flat melt films and laminated to one another. The multilayer film is then drawn off and solidified with the aid of a chill roll and, where appropriate, other rolls.

The biaxial orientation is generally carried out sequentially or simultaneously. In sequential stretching, it is preferable to orient first longitudinally (i.e. in machine direction) and then transversely (i.e. perpendicularly to machine direction). This leads to orientation of the molecular chains. The longitudinal orientation can be carried out with the aid of two rolls running at different speeds corresponding to the desired stretching ratio. For transverse orientation use is generally made of an appropriate tenter frame.

The temperature at which the orientation is carried out may vary within a relatively wide range and depends on the desired properties of the film. The longitudinal stretching is generally carried out at from 80 to 130° C. and the transverse stretching at from 90 to 150° C. The longitudinal orientation ratio is generally in the range from 2.5:1 to 6:1, preferably from 3:1 to 5.5:1. The transverse stretching ratio is generally in the range from 3.0:1 to 5.0:1, preferably from 3.5:1 to 4.5:1. If desired, the transverse stretching may be followed by another longitudinal orientation, and even by another transverse orientation.

In the heat-setting which follows, the film is held at a temperature of from 150 to 250° C. for from 0.1 to 10 s. The film is then wound up in the usual way.

One or both surfaces of the film may therefore have a coating. The thickness of this coating on the finished film is from 5 to 100 nm, preferably from 20 to 70 nm, in particular from 30 to 50 nm. It is preferably applied in-line, i.e. during the film-production process, advantageously prior to transverse orientation. Application by reverse gravure roll coatings is particularly preferred, and this process permits extremely uniform application of the coatings at the layer thickness mentioned. The coatings are preferably applied as solutions, suspensions, or dispersions—particularly preferably by aqueous methods and provide the film surface with additional functionality, for example making the film sealable, printable, metallizable, sterilizable, antistatic, or improving its aroma barrier for example, or permitting its adhesion to materials which would not otherwise adhere to the film surface (e.g. photographic emulsions). Examples of substances or compositions which provide additional functionality are:

Acrylates, as described by way of example in WO 94/13476, ethylvinyl alcohols, PVDC, waterglass ($Na_2SiO_4$), hydrophilic polyesters (PET/IPA polyesters containing the sodium salt of 5-sulfoisophthalic acid, for example as described in EP-A 0 144 878 or U.S. Pat. No. 4,252,885 or EP-A 0 296 620), vinyl acetates, for example as described in WO 94/13481, polyvinyl acetates, polyurethanes, the alkali metal or alkaline earth metal salts of $C_{10}$–$C_{18}$ fatty acids, and butadiene copolymers with acrylonitrile or methyl methacrylate, methacrylic acid, acrylic acid, or esters thereof.

The compositions or substances mentioned are applied in the form of dilute, preferably aqueous, solution, emulsion, or dispersion to one or both surfaces of the film. The solvent is then evaporated. If the coatings are applied in-line prior to transverse stretching, the heat treatment during transverse stretching and subsequent heat-setting is usually sufficient to evaporate the solvent and dry the coating. The dried coatings then have the abovementioned desired layer thicknesses.

The films may also be coated—preferably in an off-line process—with metals, such as aluminum, or with ceramic materials, such as $SiO_x$ or $Al_xO_y$. This in particular improves their gas-barrier properties.

The polyester film of the invention preferably also comprises a second outer layer C. The structure, thickness, and composition of this second outer layer may be selected irrespective of the other outer layer present, and the second outer layer may likewise comprise the abovementioned polymers, UV stabilizers, or polymer mixtures for the base layer or the first outer layer of the invention, but these do not have to be identical with those of the first outer layer. The second outer layer may also comprise other commonly used outer layer polymers, while these may also be provided with UV stabilizer.

If desired, there may also be an intermediate layer between the base layer and the outer layer(s). The intermediate layer may be composed of the polymers described for the base layers. In one particularly preferred embodiment, it is composed of the polyester used for the base layer. It may also comprise the conventional additives described and the UV stabilizer. The thickness of the intermediate layer is generally above 0.3 μm, preferably in the range from 0.5 to 15 μm, in particular from 1.0 to 10 μm.

The thickness of the outer layer(s) is generally above 0.1 μm, preferably in the range from 0.2 to 5 μm, in particular from 0.2 to 4 μm, and the thicknesses of the outer layers may be identical or different.

The total thickness of the polyester film of the invention may vary within wide limits and depends on the intended application. It is preferably from 4 to 500 μm, in particular from 5 to 450 μm, with preference from 6 to 300 μm, the base layer preferably making up from about 40 to 90% of the total thickness.

Weathering tests have shown that even after from 5 to 7 years (extrapolated from the weathering tests) of outdoor use the matt, UV-resistant films of the invention generally show no increased yellowing, no embrittlement, no surface cracking, and no impairment of mechanical properties.

Another advantage is that the production costs for the film of the invention are not significantly higher than those for a film made from standard polyesters. The other properties of the film of the invention relevant to its processing and use are essentially unchanged or indeed have been improved. In addition, it has been ensured that regrind can be reused during film production at a proportion of up to 50% by weight, preferably from 10 to 50% by weight, based in each case on the total weight of the film, without any significant resultant adverse effect on the physical properties of the film.

The film has excellent suitability for the packaging of foodstuffs or other consumable goods which are sensitive to light and/or to air.

In summary, the film of the invention is impermeable to UV light, is highly UV resistant, has low gloss, in particular low gloss on film surface A, and has comparatively low haze. It moreover has good winding and processing performance. It is also worthy of mention that the outer layer of the invention has good writability with respect to ballpoint pen, felt-tip pen, or fountain pen.

The gloss of film surface A is lower than 70. In one preferred embodiment the gloss of this side is less than 60, and in one particularly preferred embodiment less than 50. This surface of the film is therefore particularly effective for promotional purposes, and is therefore particularly suitable as the outer surface of packaging.

The haze of the film of the invention is smaller than 40%. In one preferred embodiment, the haze of the film is less than 35%, and in one particularly preferred embodiment less than 30%. The comparatively low haze of the film (compared with a matt monofilm; see comparative example) means that the film can, for example, be reverse-printed, or viewing windows can be incorporated through which, for example, the contents can be clearly discerned.

The surprising combination of exceptional properties gives the film of the invention excellent suitability for a wide variety of applications, for example for interior decoration, for construction of exhibition stands or for exhibition requisites, as displays, for placards, for protective glazing of machinery or of vehicles, in the lighting sector, in the fitting out of shops or of stores, as a promotional item or laminating medium, for greenhouses, roofing systems, exterior cladding, protective coverings, applications in the construction sector, or illuminated advertising profiles, blinds, or electrical applications.

Other application sectors are its use for producing labels, as a release film for producing GRP semifinished products, or as a hot-stamping foil, or in-mold labeling.

The table below (Table 1) gives again the most important film properties of the invention.

TABLE 1

| | inventive range | preferred | particularly preferred | Unit | Test method |
|---|---|---|---|---|---|
| Gloss, side A | <70 | <60 | <50 | | DIN 67 530 |
| Haze | <40 | <35 | <30 | % | ASTM-D 1003-52 |
| Coefficient of friction Side A with respect to itself | <0.6 <0.5 | <0.55 <0.55 | <0.50 <0.55 | | DIN 53 375 |
| Average roughness $R_a$ (side A) | 200–600 | 230–550 | 250–530 | nm | DIN 4768 with cutoff at 0.25 mm |
| Yellowness Index (YI) | <30 | <20 | <10 | | DIN 6167 |
| High UV resistance | yes | | | | |
| Permeability to UV light from wavelength | >350 | >360 | | nm | |

The methods used to characterize the polymers and the films were as follows:

Test Methods

DIN=Deutsches Institut fur Normung

ISO=International Organization for Standardization

ASTM=American Society for Testing and Materials

Mechanical Properties

Modulus of elasticity and tensile strength at break, and tensile strain at break, were measured longitudinally and transversely to ISO 527-1-2.

Weathering (Bilateral), UV Resistance

UV resistance is tested as follows to the ISO 4892 test specification:

| Test equipment: | Atlas Ci65 Weather-Ometer |
|---|---|
| Test conditions: | to ISO 4892, i.e. artificial weathering |
| Irradiation time: | 1000 hours (per side) |
| Irradiation: | 0.5 W/m², 340 nm |
| Temperature: | 63° C. |
| Relative Humidity: | 50% |

-continued

| | |
|---|---|
| Xenon lamp: | internal and external filter made from borosilicate |
| Irradiation cycles: | 102 minutes of UV light, then 18 minutes of UV light with water spray on the specimens, then again 102 minutes of UV light, etc. |
| Numerical values of <0.6 can be disregarded and mean that no significant color change has occurred. | |

Yellowness Index

Yellowness Index (YI) is the deviation from colorlessness in the "yellow" direction and is measured to DIN 6167. Yellowness Indices (YIs)<5 are not visually detectable.

Each of the examples and comparative examples below concerns films of varying thickness, produced on the extrusion line described.

All of the films were weathered bilaterally, each for 1 000 hours per side, to the test specification ISO 4892 using the Atlas Ci65 Weather-Ometer, and then tested for mechanical properties, Yellowness Index (YI), surface defects, light transmittance, and gloss.

The examples below illustrate the invention.

Example 1 a) Preparation of Component II for the Outer Layer Mixture of the Invention

A copolyester having about 90 mol % of isophthalic acid and 10 mol % of the sodium salt of 5-sulfoisophthalic acid as acid component and 100 mol % of ethylene glycol as glycol component was prepared by the following process:

A stainless steel reaction vessel of 2 l capacity, equipped with an anchor stirrer, a thermal element for measuring the temperature of the vessel contents, an 18-inch Claisen/Vigreux distillation column with condenser and receiver, an inlet opening, and a heating jacket, was preheated to 190° C. and flushed with nitrogen. 1065.6 g of dimethyl isophthalate, 180.6 g of the sodium salt of dimethyl 5-sulfoisophthalate, and 756.9 g of ethylene glycol were placed in the vessel. A buffer ($Na_2CO_3 \cdot 10H_2O$–0.439 g) and a transesterification catalyst ($Mn(OAc)_2 \cdot 4H_2O$–0.563 g) were also placed in the vessel. The mixture was heated with stirring, whereupon methanol distilled off. During the distillation the temperature in the vessel was gradually increased to 250° C. When the distillate weight corresponded to the theoretical methanol yield, an ethylene glycol solution comprising 0.188 g of phosphorous acid was added. The distillation column was replaced by a curved vapor take-off with receiver. 20 g of pure ethylene carbonate were added to the reaction mixture, whereupon vigorous evolution of gas ($CO_2$) began immediately. $CO_2$ evolution subsided after about 10 min. A reduced pressure of 240 mmHg was then applied, and the polycondensation catalyst (0.563 g of $Sb_2O_3$ slurried in ethylene glycol) was added. The reaction mixture was stirred for 10 min while the reduced pressure of 240 mmHg was maintained, and then the pressure was further reduced to from 240 to 20 mmHg in steps of 10 mmHg/min. As soon as the pressure in the system had been reduced to 20 mmHg, the temperature in the vessel was raised from 250 to 290° C. at a rate of 2° C./min. When the temperature in the vessel had reached 290° C. the stirrer speed was throttled back and the pressure was reduced to not more than 0.1 mmHg. At this juncture a read-out was obtained from the stirrer motor using an ammeter. The viscosity of the polymer was controlled by allowing the polycondensation to proceed in accordance with set values for the change in the ampere value from the stirrer motor of (in each case) 2.3 A. When the desired molecular weight had been achieved, nitrogen pressure was applied to the vessel to expel the liquid polymer from the outlet stopper in the base of the vessel into an ice-water quenching bath.

B) Preparation of the Mixture for the Outer Layer A of the Invention

75% by weight of component I (polyethylene terephthalate with an SV of 680) were fed to the inlet hopper of a twin-screw extruder with 15% by weight of component II and 10% by weight of a masterbatch which comprises the UV stabilizer, and the two components were extruded together at about 300° C. and fed to the outer layer channel A of a coextrusion die.

The masterbatch is composed of 5% by weight of 2-(4, 6-diphenyl-1,3,5-triazin-2-yl)-5-hexyloxyphenol (®TINUVIN 1577) as UV stabilizer and 95% by weight of polyethylene terephthalate.

Chips made from polyethylene terephthalate were dried at 160° C. to residual moisture below 50 ppm and sent to the extruder for the base layer. Chips made from polyethylene terephthalate and from the UV masterbatch were likewise fed, with a filler, to the extruder for the outer layer C. A matt three-layer film with ABC structure and total thickness 12 µm was then produced by coextrusion followed by stepwise longitudinal and transverse orientation. The thickness of each of the outer layers was 1.5 µm.

| Base layer B: | |
|---|---|
| 95% by weight | of polyethylene terephthalate (RT 49 from Hoechst AG) with an SV of 800 and |
| 5% by weight | of masterbatch made from 99% by weight of polyethylene terephthalate and 1.0% by weight of silica particles (Sylobloc ® 44 H from the company Grace) with an average particle size of 4.5 µm. |
| Outer layer A: | |
| 75% by weight | of component I |
| 15% by weight | of component II, and |
| 10% by weight | of UV masterbatch made from 5% by weight of ® TINUVIN 1577 and 95% by weight of polyester |
| Outer layer C | |
| 80% by weight | of polyethylene terephthalate (RT 49 from Hoechst AG) with SV of 800 and |
| 10% by weight | of masterbatch made from 99% by weight of polyethylene terephthalate and 1.0% by weight of silica particles (Sylobloc 44 H from the company Grace) with an average particle size of 4.5 µm, and |
| 10% by weight | of UV masterbatch made from 5% by weight of ® TINUVIN 1577, 95% by weight of polyethylene terphthalate |
| The individual steps of the process were: | | |
| Longitudinal stretching | Temperature: | 85–135° C. |
| | Longitudinal stretching ratio: | 4.0:1 |
| Transverse | Temperature: | 85–135° C. |

-continued

| stretching Setting | Transverse stretching ratio: Temperature: | 4.0:1 230° C. |
|---|---|---|

Example 2

In a manner similar to that of Example 1, a three-layer film with a total thickness of 12 μm was produced by coextrusion. Only the composition of outer layer A was changed:

Outer Layer A:

70% by weight of component I

20% by weight of component II, and

10% by weight of UV masterbatch.

Example 3

A coextruded film using the mixing specification of Example 1, in which the composition of outer layer A was as follows:

65% by weight of component I

25% by weight of component II, and

10% by weight of UV masterbatch.

Example 4

A coextruded film using the mixing specification of Example 1, in which the composition of outer layer A was as follows:

55% by weight of component I

35% by weight of component II, and

10% by weight of UV masterbatch.

Comparative Example

A monofilm was produced and had the composition of outer layer A from Example 3. The film surfaces had the required mattness, but the film did not meet the set requirements because it had excessive haze. It was also very difficult to produce the film by a process which was reliable and therefore cost-effective.

The film is moreover not UV-resistant and transmits the harmful UV light. After 1 000 hours of weathering the film exhibits cracks and embrittlement phenomena, and also visible yellowing.

| Ex. No. | Yellow-ness Index (YI) | Film thick-ness (μm) | Outer layer thick-ness (μm) | Film struc-ture | Gloss (60° measurement angle) Side A | Gloss (60° measurement angle) Side C | Haze | Permea-bility to radiation (nm) |
|---|---|---|---|---|---|---|---|---|
| 1 | 1.3 | 12 | 1.5/1.5 | ABC | 65 | 175 | 2 | >360 |
| 2 | 1.4 | 12 | 1.5/1.5 | ABC | 55 | 175 | 2 | >360 |
| 3 | 1.2 | 12 | 1.5/1.5 | ABC | 45 | 175 | 2 | >360 |
| 4 | 1.3 | 12 | 1.5/1.5 | ABC | 35 | 175 | 3 | >360 |
| CE | 1.7 | 12 | | A | 35 | 160 | 70 | >280 |

After 1 000 hours of weathering using the Atlas Ci65 Weather-Ometer the films of Examples 1–4 do not show any kind of embrittlement, nor any cracking, and their Yellowness Indices are <10.

The invention claimed is:

1. A coextruded, biaxially oriented polyester film composed of a polyester base layer and of at least one outer layer, wherein the film has at least one matt outer layer which comprises a UV stabilizer and a mixture or a blend or a mixture and a blend made from two components I and II, wherein component I is essentially a polyethylene terephthalate homopolymer or polyethylene terephthalate copolymer or a mixture made from polyethylene terephthalate homopolymer or from polyethylene terephthalate copolymers, and component II is a polymer which contains at least one sulfonate group, said UV stabilizer present in said outer layer(s) alone, wherein said film does not transmit UV radiation of less than or equal to 360 nm.

2. The film as claimed in claim 1, wherein component II is a condensation product of the following monomers or of their derivatives capable of forming polymers or of the following monomers and of their derivatives capable of forming polymers:
  A) from about 65 to about 95 mol % of isophthalic acid,
  B) from 0 to about 30 mol % of at least one aliphatic dicarboxylic acid with the formula $HOOC(CH_2)_nCOOH$ where n is from 1 to 11;
  C) from about 5 to about 15 mol % of at least one suffomonomer containing an alkali metal sulfonate group on the aromatic moiety of a dicarboxylic acid;
  D) a copolymerizable aliphatic or cycloaliphatic glycol having from 2 to 11 carbon atoms, in the stoichiometric amount necessary to form about 100 mol % of condensate;
    wherein each of the percentages given is based on the total amount of the monomers forming component II.

3. The film as claimed in claim 1, wherein the ratio of components I and II is from I:II=about 10:about 90 to I:II=about 95:about 5.

4. The film as claimed in claim 1, wherein the UV stabilizer is selected from the group consisting of 2-hydroxybenzotriazoles, triazines and mixtures of these.

5. The film as claimed in claim 1, wherein the outer layer has a thickness of from about 0.2 to about 6 μm.

6. The film as claimed in claim 1, wherein the film has two layers and is composed of the base layer and of the outer layer.

7. The film as claimed in claim 1, wherein the film has three layers and is composed of the base layer and of an outer layer on each side of the base layer.

8. The film as claimed in claim 6 or 7, wherein an outer layer comprises an inorganic filler.

9. The film as claimed in claim 7, wherein said second outer layer and said base layer alone further comprise at least one antiblocking agent.

10. The film as claimed in claim 1, wherein at least one surface of the film is metallized or is coated with $SiO_x$, $Al_xO_y$, ethylvinyl alcohol, PVDC, water glass, hydrophilic polyester, vinyl acetate, polyvinyl acetate, polyurethane, fatty acid salts of alkali metals or of alkaline earth metals, butadiene copolymer, (meth)acrylic acid or eaters thereof, or silicone.

11. A process for producing a film as claimed in claim 1, in which polyester melts corresponding to the compositions of the outer and base layers are fed to a coextrusion die, and extruded from the die onto a chill roll, and the resultant prefilm is then biaxially oriented and heat-set, where the polyester melts for one or more of the base layer and for the outer layer comprise at least one UV stabilizer, and the polyester melt for the outer layer comprises a mixture or a blend or a mixture and a blend made from two components I and II, where component I is a polyethylene terephthalate homopolymer or polyethylene terephthalate copolymer or a mixture made from polyethylene terephthalate homo- or copolymers and component II is a polymer which contains at least one sulfonate group.

12. A method of making an interior decoration, a display, a placards, a protective glazing, a shop outfit, a promotional requisite, a laminating medium, an exterior cladding, a protective covering, an illuminated advertising profile, or a blind, which comprises converting a film as claimed in claim 1 into an interior decoration, a display, a placards, a protective glazing, a shop outfit, a promotional requisite, a laminating medium, an exterior cladding, a protective covering, an illuminated advertising profile, or a blind.

13. The film as claimed in claim 1, said film containing from 10 to 50% by weight of recycle formed from said film.

14. The film as claimed in claim 1, wherein the base layer comprises from about 40 to 90% of the total thickness and the UV stabilizer is present in said outer layer(s) in an amount ranging from 0.01 to 5% by weight.

* * * * *